United States Patent

(12) United States Patent
Jiang et al.

(10) Patent No.: US 8,597,526 B2
(45) Date of Patent: Dec. 3, 2013

(54) METHOD FOR MAKING GRAPHENE/CARBON NANOTUBE COMPOSITE STRUCTURE

(75) Inventors: Kai-Li Jiang, Beijing (CN); Xiao-Yang Lin, Beijing (CN); Lin Xiao, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/303,351

(22) Filed: Nov. 23, 2011

(65) Prior Publication Data

US 2012/0298619 A1 Nov. 29, 2012

(51) Int. Cl.
*H01B 13/00* (2006.01)
(52) U.S. Cl.
USPC .............. 216/20; 216/13; 216/33; 216/36; 438/96

(58) Field of Classification Search
USPC .......... 530/391.1; 438/694, 409, 20; 429/401, 429/207; 428/688, 408, 403, 366, 336; 428/293.7, 119; 427/554, 331, 256; 423/447.3; 381/164; 361/502; 345/75.2, 179; 324/693; 313/495; 257/9, 659, 40, 500; 250/440.11, 326, 250/311, 201.3; 228/101; 216/36, 33, 20; 156/296, 250, 155
See application file for complete search history.

(56) References Cited

U.S. PATENT DOCUMENTS

2005/0271574 A1 12/2005 Jang et al.
2008/0248235 A1 10/2008 Feng et al.
2009/0056854 A1* 3/2009 Oh et al. .................... 156/60
2009/0239331 A1* 9/2009 Xu et al. .................... 438/98
2009/0317926 A1* 12/2009 Zhang et al. ................ 438/20
2011/0123776 A1 5/2011 Shin et al.
2012/0021224 A1* 1/2012 Everett et al. ............ 428/408
2012/0192931 A1 8/2012 Jeon et al.

FOREIGN PATENT DOCUMENTS

| CN | 101734650 | 6/2010 |
| JP | 2009-91174 | 4/2009 |
| JP | 2010-52972 | 3/2010 |
| TW | 200833862 | 8/2008 |
| WO | WO2011016616 | 2/2011 |

OTHER PUBLICATIONS

Tung et al. Low-Temperature Solution processing of Graphene-Carbon Nanotube Hybrid Materials for High-Performance Transparent Conductors, Nano Letters, vol. 9, No. 5, 2009, pp. 1949-1955.*

(Continued)

*Primary Examiner* — Duy Deo
*Assistant Examiner* — Erin Bergner
(74) *Attorney, Agent, or Firm* — Altis & Wispro Law Group, Inc.

(57) ABSTRACT

A method for making a graphene/carbon nanotube composite structure includes providing a metal substrate including a first surface and a second surface opposite to the first surface, growing a graphene film on the first surface of the metal substrate by a CVD method, providing at least one carbon nanotube film structure on the graphene film, and combining the at least one carbon nanotube film structure with the graphene film, coating a polymer layer on the at least one carbon nanotube film structure, and combining the polymer layer with the at least one carbon nanotube film structure and the graphene film, and forming a plurality of stripped electrodes by etching the metal substrate from the second surface.

20 Claims, 17 Drawing Sheets

(56) References Cited

OTHER PUBLICATIONS

Xuesong Li et al. Large-Area Synthesis of high-Quality and Uniform Graphene Films on Copper Foils, Science 324, 2009, pp. 1312-1314.*

Xuesong Li et al. Supporting Online information, Large-Area Synthesis of high-Quality and Uniform Graphene Films on Copper Foils, Supporting online material, Science 324, 2009, pp. 1-3.*

* cited by examiner

METHOD FOR MAKING GRAPHENE/CARBON NANOTUBE COMPOSITE STRUCTURE

CROSS-REFERENCE TO RELATED APPLICATIONS

This application claims all benefits accruing under 35 U.S.C. §119 from China Patent Application No. 201110140263.9, filed on May 27, 2011, in the China Intellectual Property Office, the contents of which are hereby incorporated by reference.

BACKGROUND

1. Technical Field

The present disclosure relates to a method for making graphene/carbon nanotube composite structure.

2. Description of Related Art

Graphene and carbon nanotubes are both allotropes of carbon. Graphene is a carbonaceous material composed of carbon atoms densely packed in a two dimensional honeycomb crystal lattice. Graphene has excellent electrical and thermal properties. An electron mobility of graphene at room temperature is about 15000 $cm^2V^{-1}s^{-1}$. A thermal conductivity of the graphene is about 3000 $Wm^{-1}K^{-1}$. A carbon nanotube has a hollow cylindrical nanostructure formed by rolling the graphene. A carbon nanotube can have a large length-to-diameter ratio and is a one dimensional structure. Carbon nanotubes have excellent electrical, mechanical, and chemical properties. The carbon nanotubes and graphene can have a film structure. A composite film structure composed of the carbon nanotubes and the graphenes has received a great deal of interest because of the specific properties of the carbon nanotubes and graphenes.

Composite film structures composed of carbon nanotubes and graphenes can be created by a mixture of graphene fragments and carbon nanotube powder dispersed in a solvent. In the composite film structures, graphene is in the form of fragments, not as a complete layer structure. Thus, the conductivity and ductility of the composite film structure is much lower than the complete graphene layer. In addition, the carbon nanotubes are disorderly distributed in the composited film structure. Thus, light transmittance of the composite film structure is relatively low.

What is needed, therefore, is to provide a graphene/carbon nanotube composite structure having excellent conductivity, ductility, and light transmittance.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
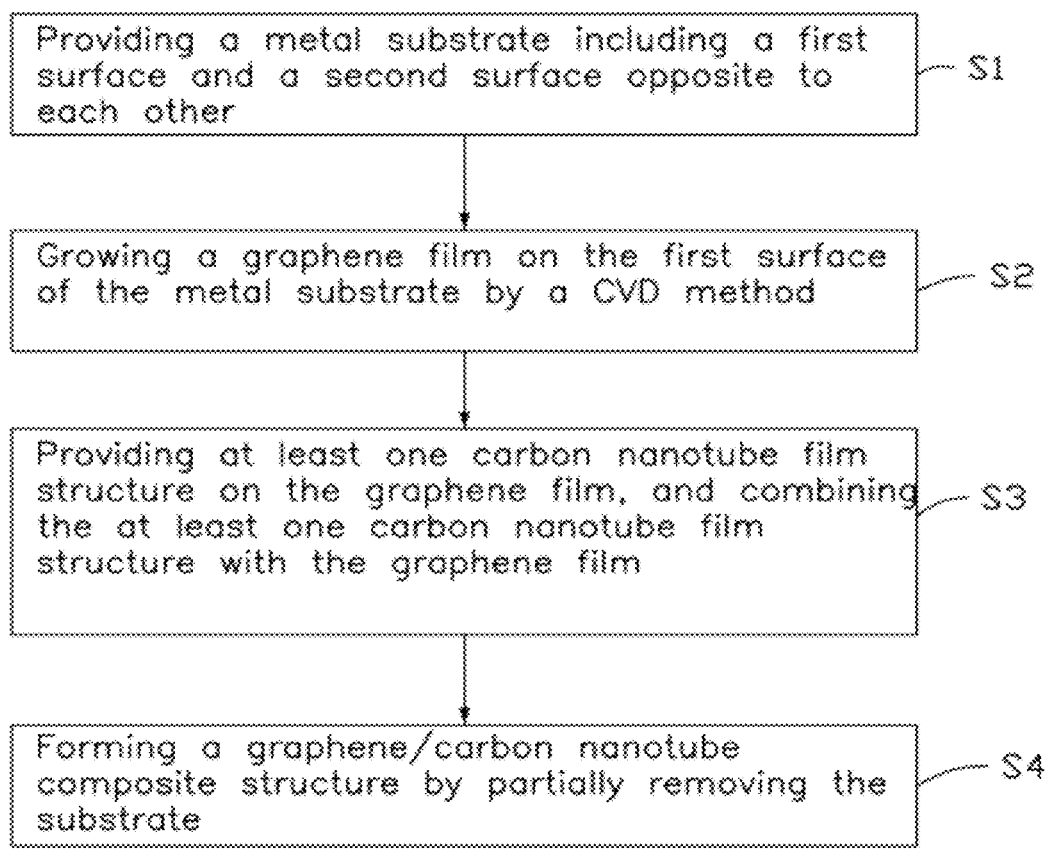
FIG. 1 shows a flowchart of one embodiment of a method for making a graphene/carbon nanotube composite structure.
Figure 2:
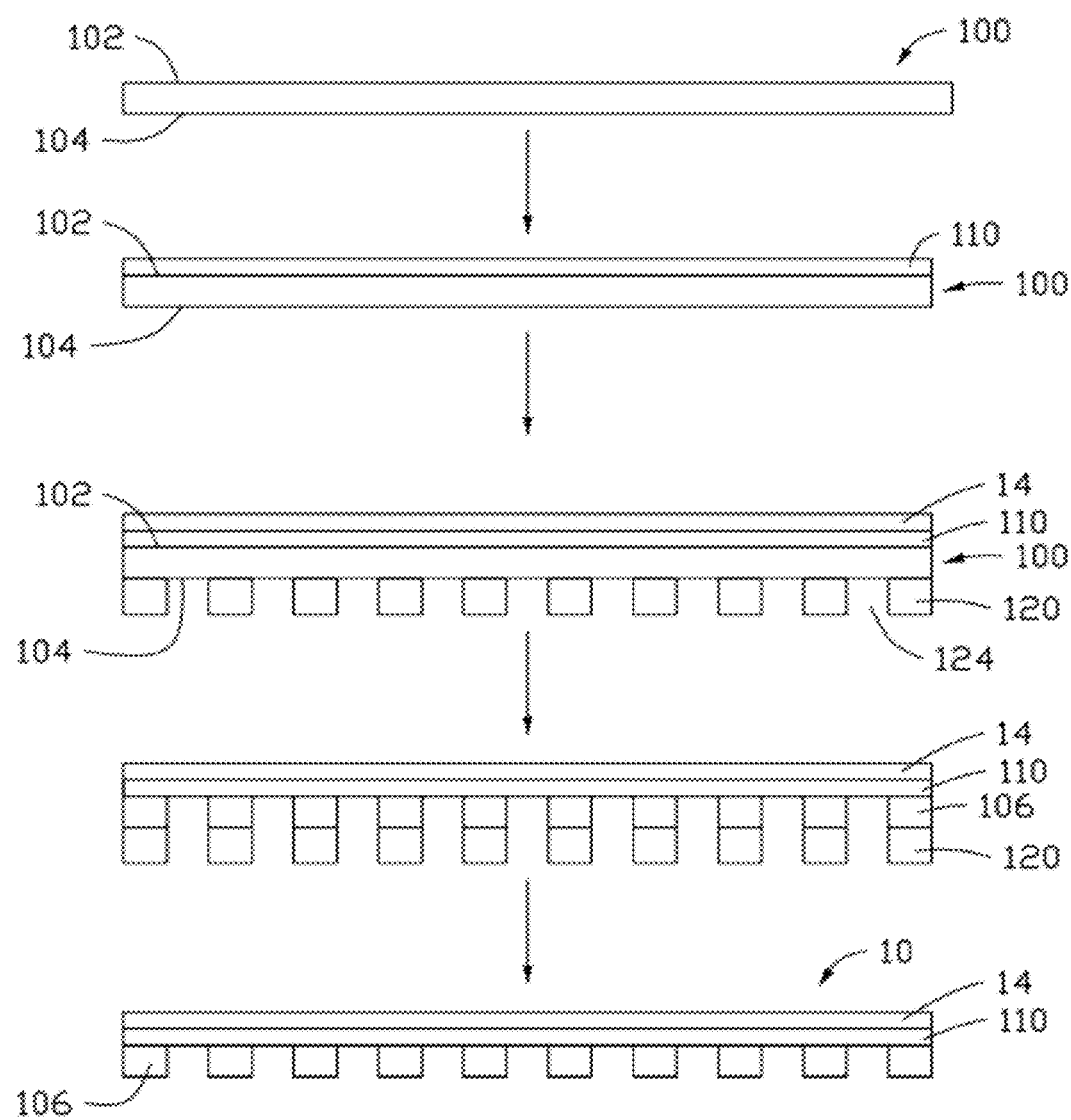
FIG. 2 shows a number of cross-sectional views of the method for making a graphene/carbon nanotube composite structure in FIG. 1.

Referring to FIG. 1 and FIG. 2, one embodiment of a method for making a graphene/carbon nanotube composite structure 10 includes:

S1, providing a metal substrate 100 including a first surface 102 and a second surface 104 opposite to each other;

S2, growing a graphene film 110 on the first surface 102 of the metal substrate 100 by a chemical vapor deposition (CVD) method;

S3, providing at least one carbon nanotube film structure 14 on the graphene film 110, and combining the at least one carbon nanotube film structure 14 with the graphene film 110; and S4, forming a graphene/carbon nanotube composite structure 10 by partially removing the substrate 100.

In step S1, the metal substrate 100 can be a metal foil with a thickness in a range from about 100 nanometers to about 100 micrometers. A material of the metal substrate 100 can be copper or nickel. A shape of the metal substrate 100 is not limited. An area of the metal substrate 100 can be set according to the volume of the chamber used to grow the graphene film 110 by the CVD method. The metal substrate 100 can be rolled up and placed in the chamber to grow the graphene film 110 with a large area. In one embodiment, the metal substrate 100 is a copper foil with a thickness of about 25 micrometers.

Step S2 includes the steps of:

S21, disposing the metal substrate 100 in a reacting chamber;

S22, heating the metal substrate 100 to a predetermined temperature; and

S23, supplying a carbon source gas into the reacting chamber, thereby forming the graphene film 110 on the first surface 102 of the metal substrate 100.

In step S21, the reacting chamber can provide a reaction space for forming the graphene film 110. The reacting chamber can have a sealed cavity. The reacting chamber includes a gas inlet and a gas outlet. The gas inlet is used to input a reaction gas. The gas outlet is connected with an evacuating device. The evacuating device can be used to adjust the pressure in the reacting chamber. Furthermore, the reacting chamber can include a water cooling device to adjust the temperature in the reacting chamber. The reacting chamber can be a quartz tube furnace. An area of the metal substrate 100 can be adjusted according to the volume of the reacting chamber. The metal substrate 100 with a relatively large area can be bent or curved so that it can be placed in the reacting chamber.

In step S22, the first surface 102 of the metal substrate 100 is heated to become more flat. The flatter the first surface 102, the easier to form the graphene film 110 on the first surface 102 of the metal substrate 100. The reacting chamber is evacuated before heating the metal substrate 100. In one embodiment, hydrogen gas can be imported in the reacting chamber through the gas inlet before heating the metal substrate 100. The hydrogen gas can reduce an oxide layer on the first surface 102 of the metal substrate 100, and can further prevent the metal substrate 100 from oxidizing. A flow rate of the hydrogen gas can be in a range from about 2 standard cubic centimeters per minute (sccm) to about 35 sccm. A heating temperature can be in a range from about 800° C. to about 1500° C. A heating period can be in a range from about 20 minutes to about 60 minutes. A pressure in the reacting chamber can be in a range from about 0.1 Pa to about 100 Pa. In one embodiment, the flow rate of the hydrogen gas is about 2 sccm, the pressure of the reacting chamber is about 13.3 Pa, the heating temperature is about 1000° C., a temperature rising period is about 40 minutes, and the constant temperature period at the heating temperature is about 20 minutes.

In step S23, carbon atoms can be deposited on the first surface 102 of the metal substrate 100, thereby forming the graphene film 110 composed of carbon atoms. The hydrogen gas is continuously imported through the gas inlet in step S23 during the process of growing the graphene film 110. The flow rate of the hydrogen gas, while supplying the carbon source gas into the reacting chamber, is the same as that of the step S22. A ratio between the flow rate of the carbon source gas and the hydrogen gas is in a range from about 45:2 to about 15:2. The carbon source gas can be at least one of methane, ethane, ethylene, or acetylene. While supplying the carbon source gas, the temperature in the reacting chamber can be in a range from about 800° C. to about 1500° C. with a constant temperature period in a range from about 10 minutes to about 60 minutes. A pressure in the reacting chamber can be in a range from about $10^{-1}$ Pa to about $10^2$ Pa. In one embodiment, the pressure of the reacting chamber is about 66.5 Pa, the temperature of the reacting chamber is about 1000° C., the flow rate of the carbon source gas is about 25 sccm, the carbon nanotube gas is methane, and the constant temperature period is about 30 minutes.

In step S23, the metal substrate 100 can be cooled after forming the graphene film 110 thereon. While cooling the metal substrate 100, the carbon source gas and the hydrogen gas can be continuously flowed into the reacting chamber. The flow rate of the carbon source gas and the hydrogen gas and the pressure of the reacting chamber are constant. In one embodiment, the metal substrate 100 is cooled for about 1 hour. After cooling the metal substrate 100, the metal substrate 100 with the graphene film 110 grown thereon is taken out of the reacting chamber.

Figure 3:
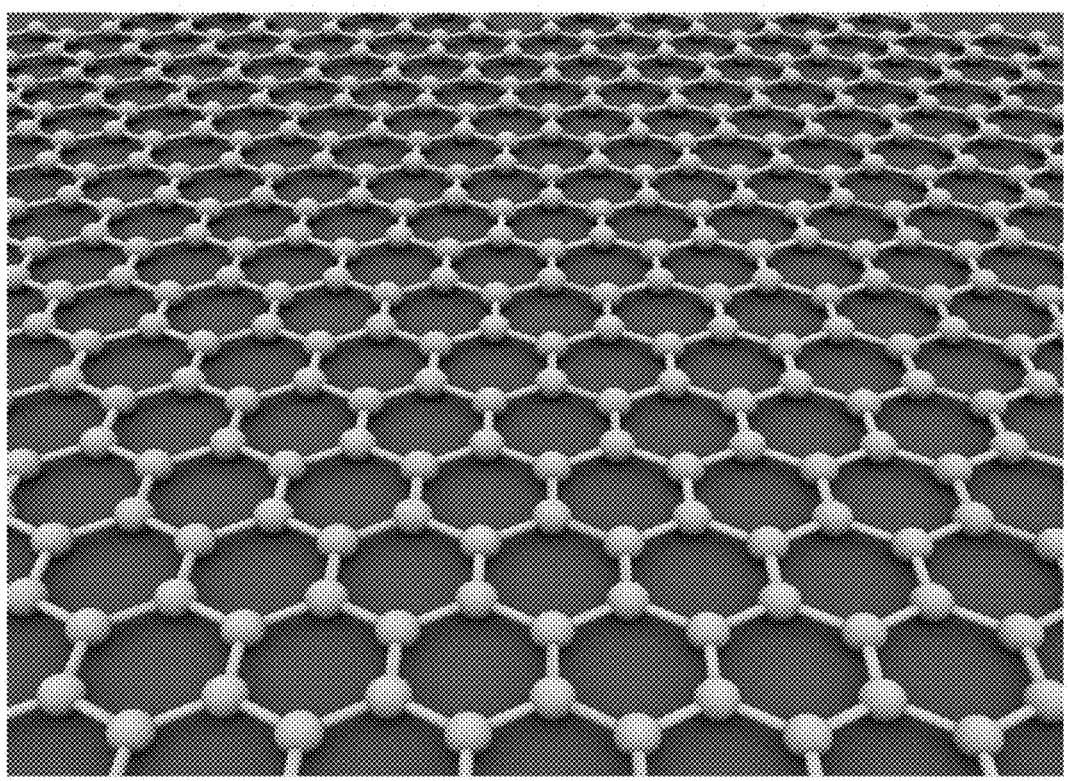
FIG. 3 is a structural view of a graphene.

The graphene film 110 is a two dimensional film structure. A thickness of the graphene film 110 can be in a range from about 0.34 nanometers to about 10 nanometers. The graphene film 110 can include at least one graphene layer. Referring to FIG. 3, the graphene layer is a one-atom thick sheet composed of a plurality of $sp^2$-bonded carbon atoms. If the graphene film 110 includes a plurality of graphene layers, the plurality of graphene layers can overlap each other to form a large area, or stacked with each other to form a large thickness. In one embodiment, the graphene film 110 has a single graphene layer. The graphene layer is a one-atom thick planar sheet composed of a plurality of $sp^2$-bonded carbon atoms. The graphene film 110 having one graphene layer has a high transmittance of 97.7%. A heat capacity of the graphene film 110 can be less than $2\times10^{-3}$ J/cm$^2$·K. In one embodiment, the heat capacity of the graphene film 110 having one graphene layer is less than $5.57\times10^{-4}$ J/cm$^2$·K. The graphene film 110 can be a free-standing structure. The term "free-standing structure" means that the graphene film 110 can sustain the weight of itself when it is hoisted by a portion thereof without any significant damage to its structural integrity. So, if the graphene film 110 is placed between two separate supports, a portion of the graphene film 110 not in contact with the two supports, would be suspended between the two supports and yet maintain structural integrity.

It is understood that carbon atoms can also be deposited on the second surface 104 of the metal substrate 100, thereby forming another graphene film (not shown in FIG. 2) on the second surface 104. Alternatively, the another graphene film on the second surface 104 can be removed in some embodiments by polishing. Step S23 can further include a step of polishing the second surface 104 of the metal substrate 100, after the graphene film 110 is grown on the first surface 102.

Figure 4:
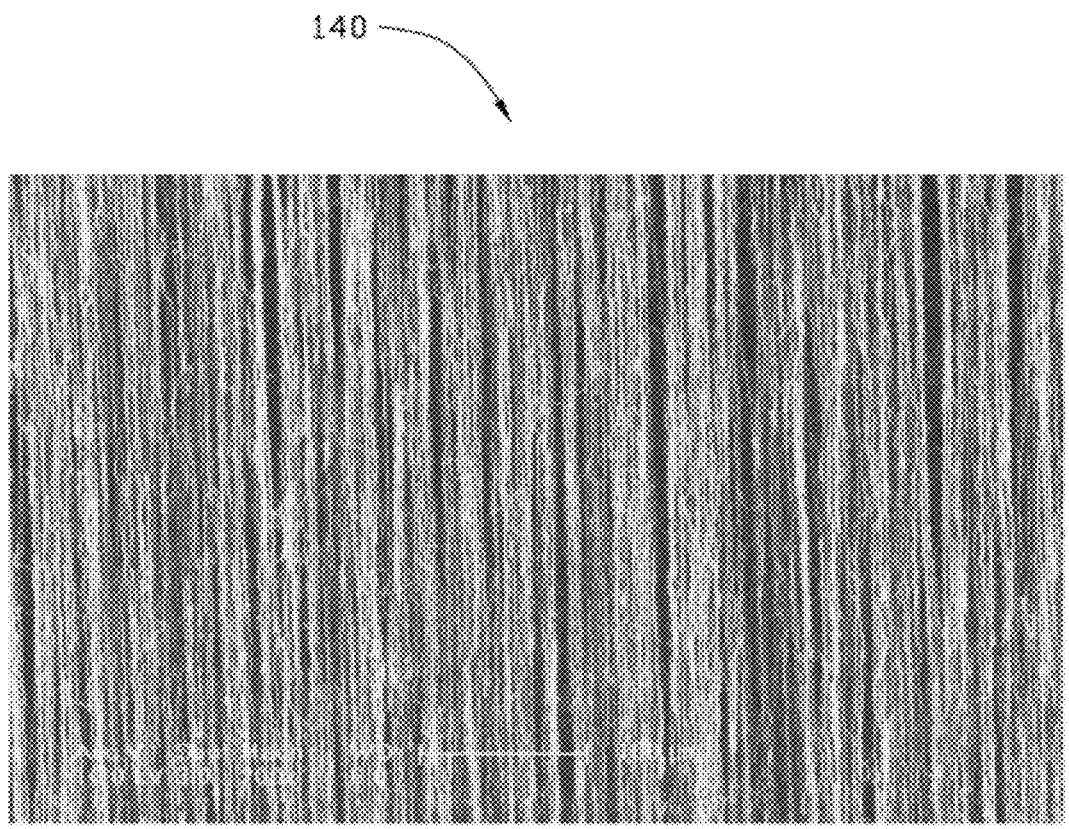
FIG. 4 is a Scanning Electron Microscopic (SEM) image of a drawn carbon nanotube film.

In step S3, the carbon nanotube film structure 14 can include one drawn carbon nanotube film or a plurality of drawn carbon nanotube films stacked with each other. Referring to FIG. 4, the drawn carbon nanotube film 140 in the carbon nanotube film structure 14 includes a plurality of successive and oriented carbon nanotubes joined end-to-end by van der Waals attractive force therebetween. The carbon nanotubes in the drawn carbon nanotube film 140 can be substantially aligned in a single direction and substantially parallel to a surface of the drawn carbon nanotube film 140. A large number of the carbon nanotubes in the drawn carbon nanotube film 140 can be oriented along a preferred orientation, meaning that a large number of the carbon nanotubes in the drawn carbon nanotube film 140 are arranged substantially along the same direction. A small number of the carbon nanotubes are randomly arranged in the drawn carbon nanotube film 140, and have a negligible effect on the larger number of the carbon nanotubes in the drawn carbon nanotube film 140 arranged substantially along the same direction. A thickness of the drawn carbon nanotube film 140 can be in a range from about 0.5 nanometers to about 100 micrometers.

Figure 5:
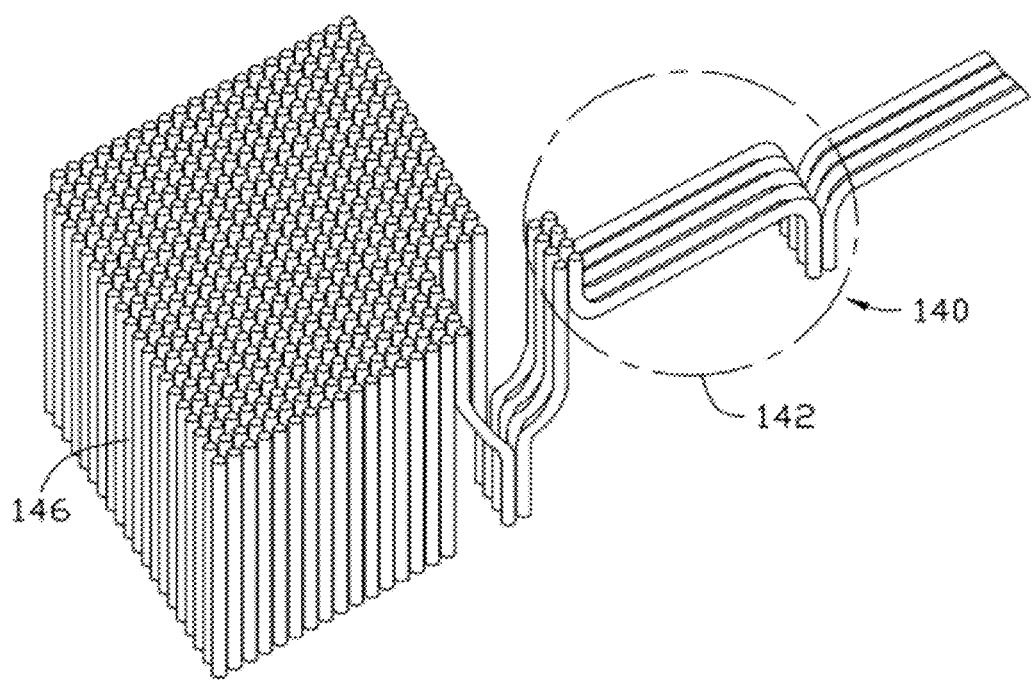
FIG. 5 is a schematic view of a method for making the drawn carbon nanotube film in FIG. 4.

Referring to FIG. 5, the drawn carbon nanotube film 140 can be formed by drawing a film from a carbon nanotube array 146 that is capable of having a film drawn therefrom by using a pulling/drawing tool.

The carbon nanotube array 146 can be formed by a CVD method. The carbon nanotube array 146 is formed on a substrate, and includes a plurality of carbon nanotubes substantially perpendicular to the surface of the substrate. The carbon nanotubes together form the carbon nanotube array 146 located on the surface of the substrate. The carbon nanotube array 146 is essentially free of impurities such as carbonaceous or residual catalyst particles. The carbon nanotubes in the carbon nanotube array 146 are closely packed together by van der Waals attractive force. Accordingly, the drawn carbon nanotube film 140 can be drawn from the carbon nanotube array 146. The length of the carbon nanotubes can be approximately 50 microns to approximately 5 millimeters. In one embodiment, the length of the carbon nanotubes can be approximately ranged from 100 microns to 900 microns. The method for growing the carbon nanotube array 146 is disclosed by patent application US20080248235 to Feng et al.

The pulling/drawing tool can be adhesive tape, pliers, tweezers, or any tool capable of gripping and simultaneously pulling multiple carbon nanotubes. The drawn carbon nanotube film 140 can be pulled/drawn out from the carbon nanotube array 146 by the following steps:

selecting a carbon nanotube segment 142 having a predetermined width from the carbon nanotube array 146; and pulling the carbon nanotube segment 142 at an even/uniform speed to achieve a uniform drawn carbon nanotube film 140.

The carbon nanotube array 146 is capable of having a film drawn therefrom. The carbon nanotube segment 142 having a predetermined width can be selected by using an adhesive tape such as the pulling/drawing tool to contact the carbon nanotube array 146. The carbon nanotube segment 142 includes a plurality of carbon nanotubes substantially parallel to each other. The pulling direction is arbitrary (e.g., substantially perpendicular to the growing direction of the carbon nanotube array).

More specifically, during the pulling/drawing process, as the initial carbon nanotube segment 142 is drawn out, other carbon nanotube segments 142 are also drawn out end-to-end due to the van der Waals attractive force between ends of adjacent segments. In general, the initially selected carbon nanotubes are drawn out from the carbon nanotube array 146 by the moving of the drawing tool. The following carbon nanotubes adjacent to the initially selected carbon nanotubes are then drawn out by van der Waals attractive force between the following carbon nanotubes and the initially selected carbon nanotubes thereby forming the drawn carbon nanotube film 140 with the carbon nanotubes joined end-to-end by van der Waals attractive force therebetween. This process of drawing ensures that a continuous, uniform free-standing drawn carbon nanotube film 140 having a predetermined width can be formed.

A width of the drawn carbon nanotube film 140 depends on the size of the carbon nanotube array 146. A length of the drawn carbon nanotube film 140 is arbitrary. In one embodiment, if the size of the substrate is 4 inches, the width of the drawn carbon nanotube film 140 is in the approximate range from 1 centimeter to 10 centimeters, and the thickness of the drawn carbon nanotube film 140 is in the approximate range from 0.01 microns to about 100 microns.

Figure 6:
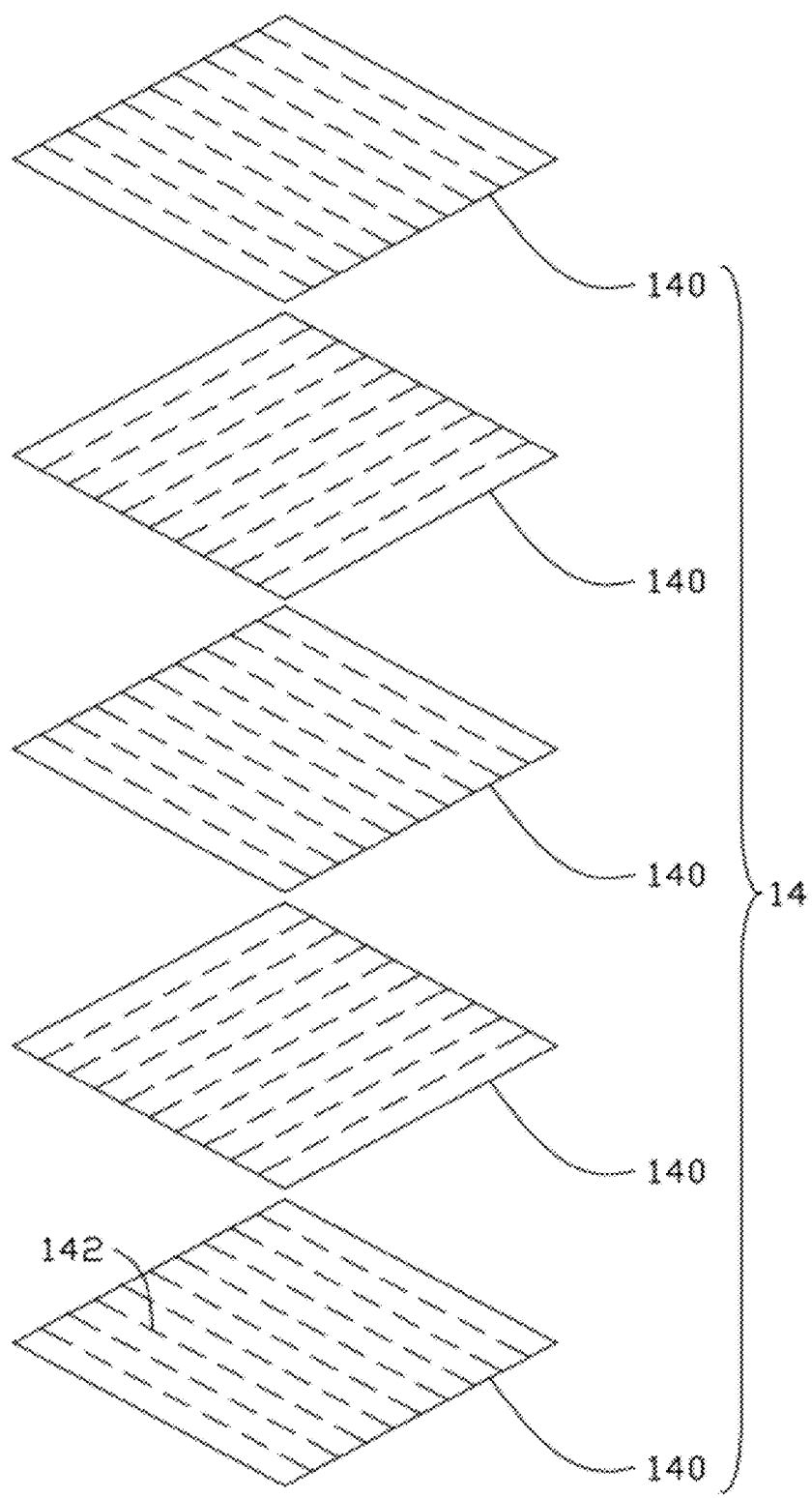
FIG. 6 is an exploded view of a carbon nanotube film structure including five drawn carbon nanotube films of one embodiment.
Figure 7:
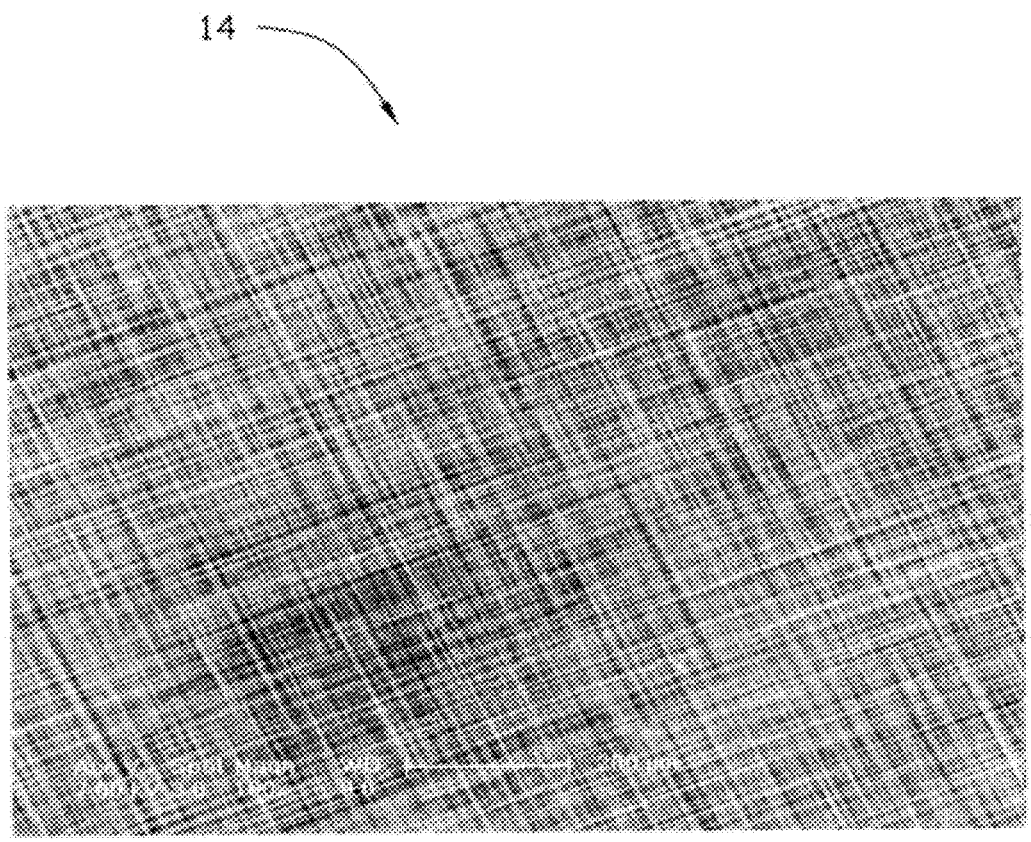
FIG. 7 is an SEM image of the carbon nanotube film structure in FIG. 6.

Referring to FIG. 6 and FIG. 7, in one embodiment, the carbon nanotube film structure 14 includes five drawn carbon nanotube films 140 crossed and stacked with each other. An angle between the adjacent drawn carbon nanotube films 140 is not limited. The carbon nanotube film structure 14 can be formed by the following steps:

providing a frame and adhering one drawn carbon nanotube film 140 to the frame along a first direction and removing the excess film outside the frame;

adhering another drawn carbon nanotube film 140 to the frame along a second direction overlapping the one drawn carbon nanotube film 140; and repeating the above steps thereby forming the carbon nanotube film structure 14.

For example, two or more such drawn carbon nanotube films 140 can be stacked on each other on the frame to form a carbon nanotube film structure 14. An angle between the alignment axes of the carbon nanotubes in every two adjacent drawn carbon nanotube films 140 is not limited. Referring to FIG. 7, in one embodiment, the angle between the alignment axes of the carbon nanotubes in every two adjacent carbon nanotube films 140 is about 90 degrees. The carbon nanotubes in every two adjacent drawn carbon nanotube films 140 are crossing each other, thereby providing the carbon nanotube film structure 14 with a microporous structure.

Figure 8:
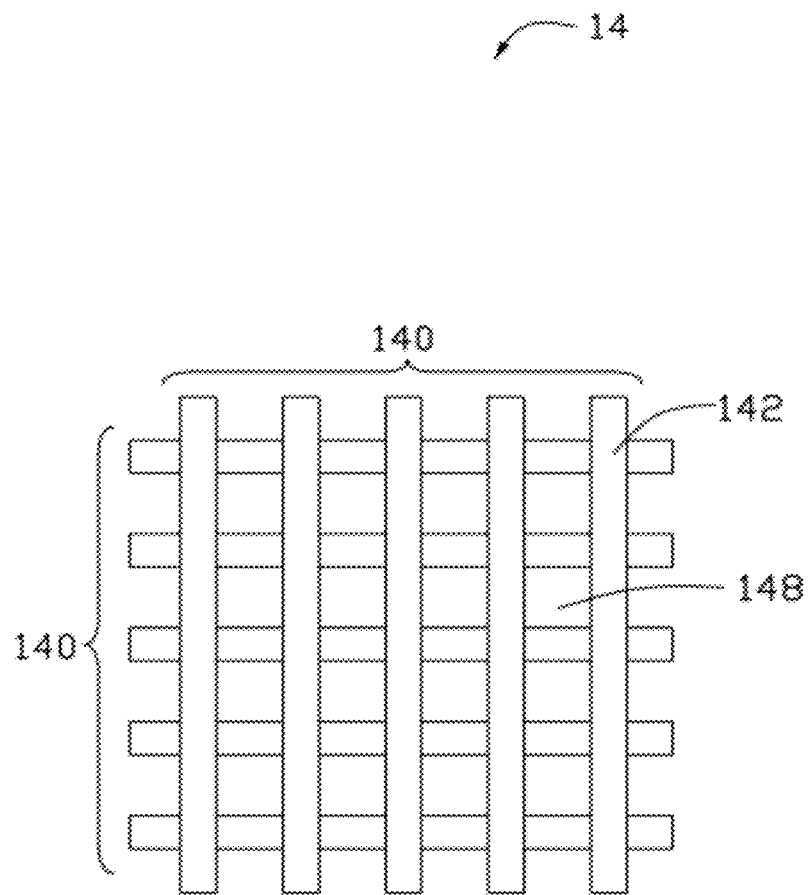
FIG. 8 is a schematic view of an enlargement part of the carbon nanotube film structure in FIG. 7.
Figure 9:
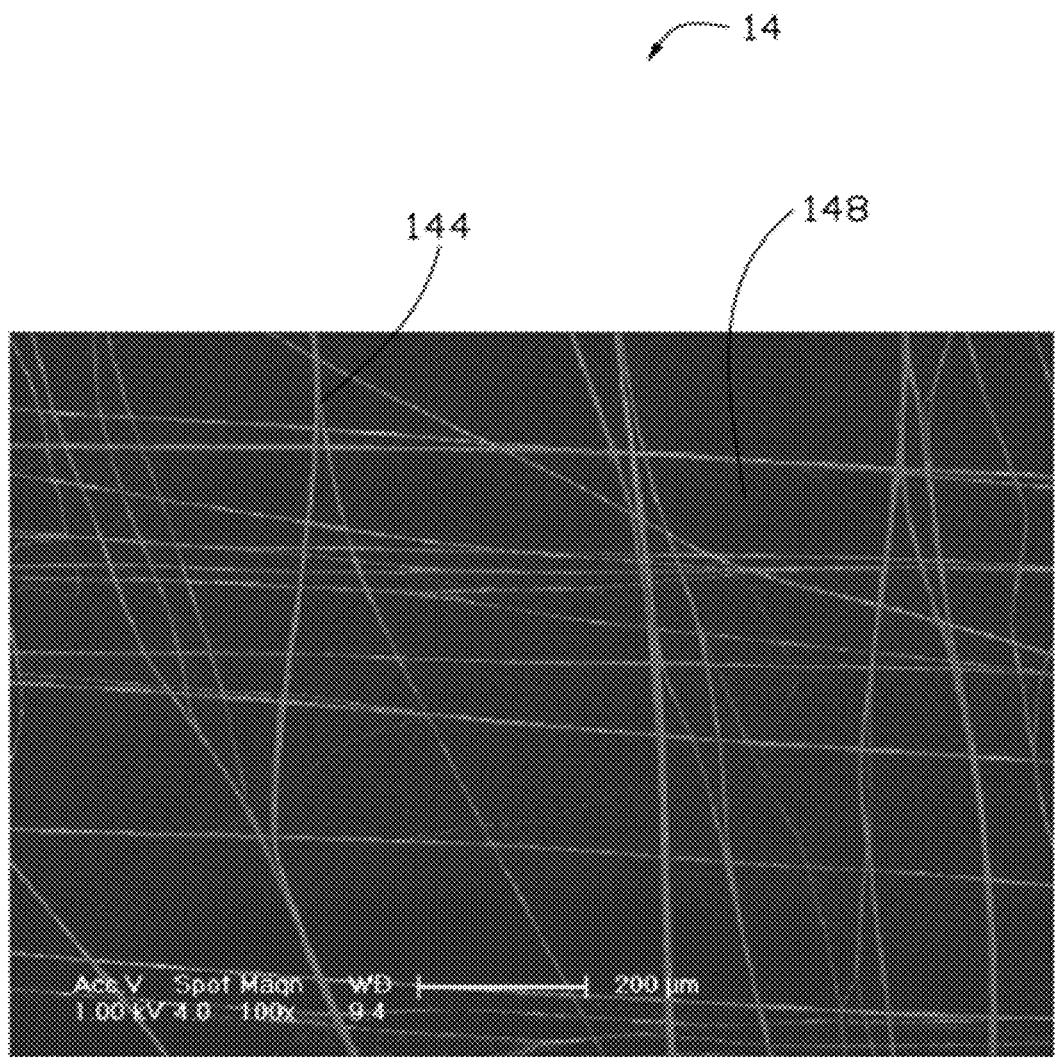
FIG. 9 is an SEM image of a carbon nanotube structure being treated by a solvent.

Referring to FIG. 6 and FIG. 8, because the drawn carbon nanotube film 140 includes a plurality of gaps between the carbon nanotube segments 142, the gaps of the adjacent drawn carbon nanotube films 140 can cross each other thereby forming a plurality of micropores 148 in the carbon nanotube film structure 14. An average dimension of the plurality of micropores 148 is in a range from about 10 nanometers to about 1 micrometer.

To increase the dimension of the micropores 148 in the carbon nanotube film structure 14, the carbon nanotube film structure 14 can be treated with an organic solvent.

The carbon nanotube film structure 14 can, beneficially, be treated by either of two methods: dropping the organic solvent from a dropper to soak the entire surface of the carbon nanotube film structure 14 fixed on a frame or a surface of a supporter, or immersing the frame with the carbon nanotube film structure 14 thereon into a container having an organic solvent therein. After being soaked by the organic solvent, the carbon nanotube segments 142 in the drawn carbon nanotube film 140 of the carbon nanotube film structure 14 can at least partially shrink and collect or bundle together.

Figure 10:
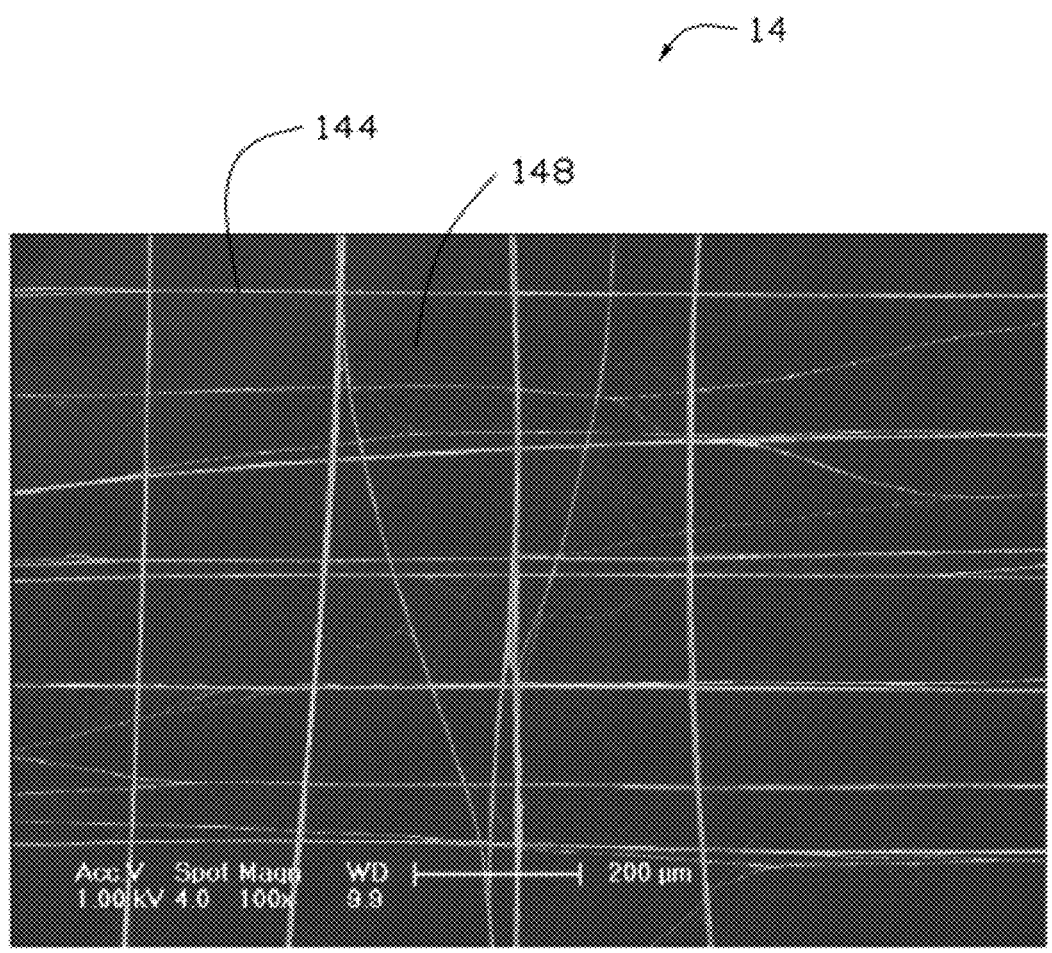
FIG. 10 is an SEM image of a carbon nanotube structure made by drawn carbon nanotube films treated by a laser.

Referring to FIG. 4 and FIG. 8, the carbon nanotube segments 142 in the drawn carbon nanotube film 140 of the carbon nanotube film structure 14 are joined end to end and aligned along a same direction, thus the carbon nanotube segments 142 would shrink in a direction perpendicular to the orientation of the carbon nanotube segments 142. If the drawn carbon nanotube film 140 is fixed on a frame or a surface of a supporter or a substrate, the carbon nanotube segments 142 would shrink into several large bundles or carbon nanotube strips 144. A distance between the adjacent carbon nanotube strips 144 is greater than the width of the gaps between the carbon nanotube segments 142 of the drawn carbon nanotube film 140. Referring to FIG. 10, due to the shrinking of the adjacent carbon nanotube segments 142 into carbon nanotube strips 144, the parallel carbon nanotube strips 144 are relatively distant (especially compared to the initial layout of the carbon nanotube segments) to each other in one layer and cross with the parallel carbon nanotube strips 144 in each adjacent layer. As such, the dimension of the micropores 148 is increased and can be in a range from about 2 micrometers to about 200 micrometers. Due to the decrease of the specific surface via bundling, the coefficient of friction of the carbon nanotube film structure 14 is reduced, but the carbon nanotube film structure 14 maintains high mechanical strength and toughness.

The organic solvent is volatilizable and can be ethanol, methanol, acetone, dichloroethane, chloroform, or any combinations thereof.

To increase the dimension of the micropores 148 in the carbon nanotube film structure 14, the carbon nanotube films 140 can be treated by a laser beam before stacking with each other to form the carbon nanotube film structure 14.

The laser beam treating method includes fixing the drawn carbon nanotube film 140 and moving the laser beam at an even/uniform speed to irradiate the drawn carbon nanotube film 140, thereby forming a plurality of carbon nanotube strips 144. A laser device used in this process can have a power density being greater than $0.1 \times 10^4$ W/m$^2$.

The laser beam is moved along a direction in which the carbon nanotubes are oriented. The carbon nanotubes absorb energy from laser irradiation and the temperature thereof is increased. Some of the carbon nanotubes in the drawn carbon nanotube film 140 will absorb more energy and be destroyed. When the carbon nanotubes along the orientation of the carbon nanotubes in the drawn carbon nanotube film 140 are destroyed due to absorbing too much energy from the laser irradiation, a plurality of carbon nanotube strips 144 is formed substantially parallel with each other. A gap between the adjacent carbon nanotube strips 144 is in a range from about 2 micrometers to about 200 micrometers.

Referring to FIG. 10, in one embodiment, a carbon nanotube film structure 14 is formed by stacking two laser treated drawn carbon nanotube films 140. The carbon nanoutbe film structure 14 includes a plurality of carbon nanotube strips 144 crossed with each other and defining a plurality of microspores 148. An average dimension of the micropores is in a range from about 2 micrometers to about 200 micrometers.

In step S3, the at least one carbon nanotube film structure 14 can be put on the graphene film 110 and cover the graphene film 110. The at least one carbon nanotube film structure 14 and the graphene film 110 can be stacked together by mechanical force. A polymer solution can be located on the graphene film 110 before putting the at least one carbon nanotube film structure 14 on the graphene film 110 to help combine the at least one carbon nanotube film structure 14 and the graphene film 110.

The polymer solution can be formed by dissolving a polymer material in an organic solution. In one embodiment, the viscosity of the solution is greater than 1 Pa-s. The polymer material can be a solid at room temperature, and can be transparent. The polymer material can be polystyrene, polyethylene, polycarbonate, polymethyl methacrylate (PMMA), polycarbonate (PC), terephthalate (PET), benzo cyclo butene (BCB), or polyalkenamer. The organic solution can be ethanol, methanol, acetone, dichloroethane or chloroform. In one embodiment, the polymer material is PMMA, and the organic solution is ethanol.

In step S3, because the drawn carbon nanotube film 140 has a good adhesive property, the plurality of drawn carbon nanotube films 140 can be directly located on the graphene film 110 step by step and crossed with each other. Therefore, the carbon nanotube film structure 14 is formed directly on the graphene film 110. Furthermore, an organic solvent can be dropped on the carbon nanotube film structure 14 to increase the dimension of the microspores 148 in the carbon nanotube film structure 14.

In step S4, the metal substrate 100 can be partially removed by a dry etching technology or wet etching technology. In one embodiment, the metal substrate 100 is partially removed by the dry etching technology, thereby forming a plurality of stripped electrodes 106 spaced from each other. Referring to FIG. 2, the method for dry etching the metal substrate 100 includes:

S41, applying a sacrifice layer 120 on the second surface 104 of the metal substrate 100, wherein the sacrifice layer 120 defines a plurality of spaced sacrifice stripped-grooves 124 to expose the second surface 104 of the partial metal substrate 100;

S42, etching the partial metal substrate 100 exposed from the sacrifice layer 120, thereby forming the plurality of stripped electrodes 106 spaced from each other and exposing a part of the graphene film 110; and S43, removing the sacrifice layer 120.

In step S41, a material of the sacrifice layer 120 can be a polymer, such as thermosetting resin, for example, polymethyl methacrylate, ethoxyline resin, unsaturated polyester, or silicon ether resin.

In step S42, the plurality of stripped electrodes 106 is electrically connected with the graphene film 110. The metal substrate 100 can be etched by the following steps:

disposing the metal substrate 100 with the sacrifice layer 120 in an inductive coupling plasma system;

etching the metal substrate 100 exposed from the sacrifice layer 120 using oxygen and chlorine gas, thereby exposing the graphene film 110.

In one embodiment, a power of the inductive coupling plasma system is about 50 W, a flow rate of the chlorine gas is about 24 sccm, a flow rate of the oxygen is about 24 sccm, and pressure of the inductive coupling plasma system is in a range from about 2 Pa to about 10 Pa, and an etching period is in a range from about 40 seconds to about 55 seconds.

In one embodiment, the metal substrate 100 is etched by wet etching technology, and the material of the metal substrate 100 is copper. Specifically, the metal substrate 100 is etched by immersing the metal substrate 100 in a Ferric trichloride (FeCl$_3$) solution, wherein a concentration of the FeCl$_3$ solution is in a range from about 0.06 mol/L to about 0.25 mol/L, the immersing period is in a range from about 4 minutes to about 15 minutes. The metal substrate 100 uncoated by the sacrifice layer 120 is removed due to a reaction between the metal substrate 100 and the FeCl$_3$ solution.

In step S43, the sacrifice layer 120 can be removed by an organic solvent. The organic solvent can be ethanol, methanol, acetone, dichloroethane, chloroform, or any combination thereof. In one embodiment, the sacrifice layer 120 is removed by acetone.

Figure 11:
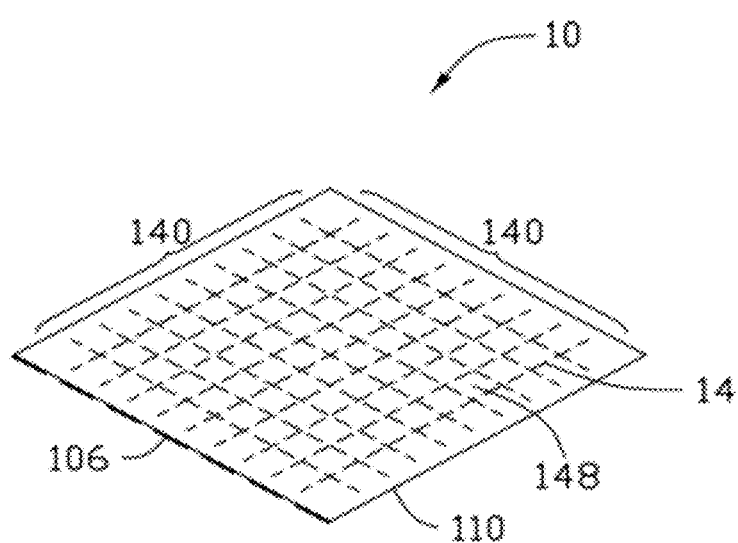
FIG. 11 is a schematic view of the graphene/carbon nanotube composite structure made by the method of FIG. 1.

Referring to FIG. 11, in one embodiment the graphene/carbon nanotube composite structure 10 made by the above method includes a carbon nanotube film structure 14, a graphene film 110, and the plurality of stripped electrodes 106. The graphene film 110 is disposed on the plurality of stripped electrodes 106. The plurality of stripped electrodes 106 can be substantially parallel to each other and electrically connected with the graphene film 110. The graphene film 110 is sandwiched between the carbon nanotube film structure 14 and the plurality of stripped electrodes 106, and respectively contacts the carbon nanotube film structure 14 and the plurality of stripped electrodes 106. The plurality of stripped electrodes 106 can support the graphene film 110 and the carbon nanotube film structure 14 and can be used as the electrodes in application.

Figure 12:
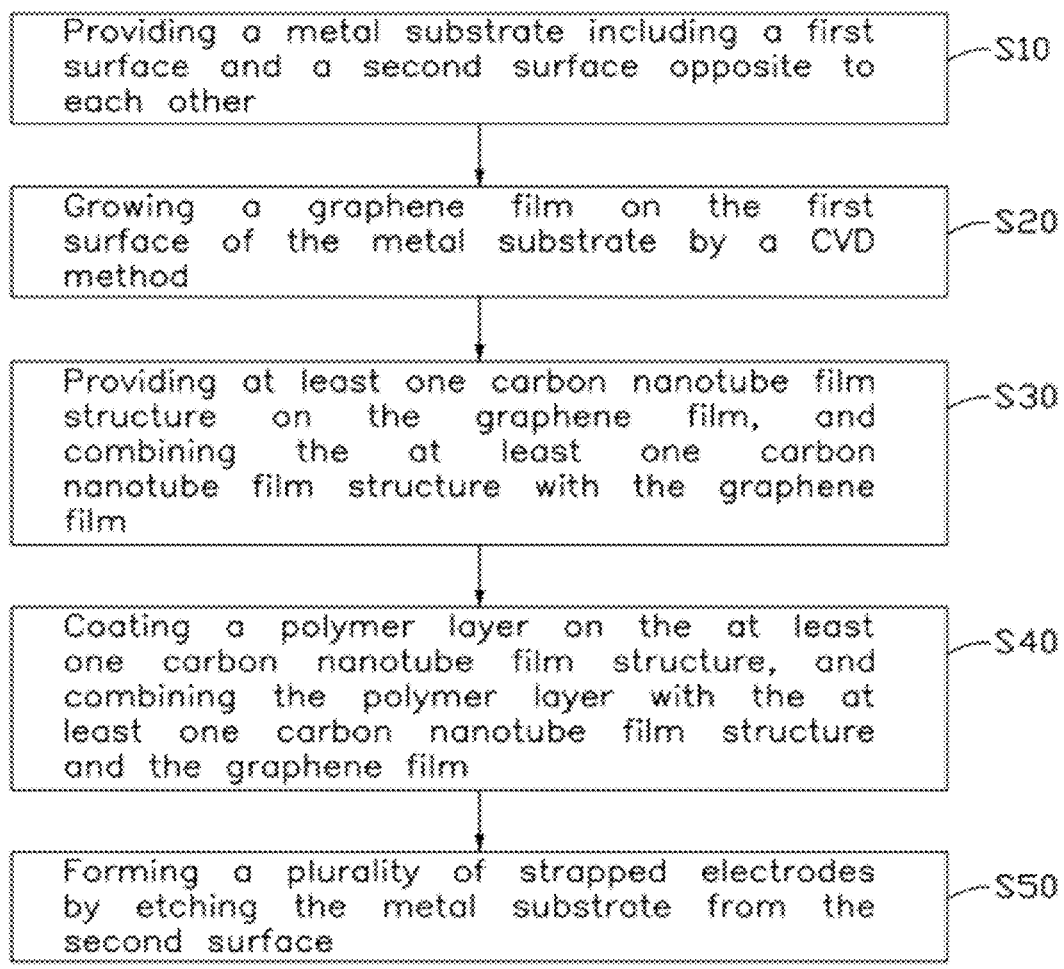
FIG. 12 is a flowchart of another embodiment of a method for making a graphene/carbon nanotube composite structure at various stages.
Figure 13:
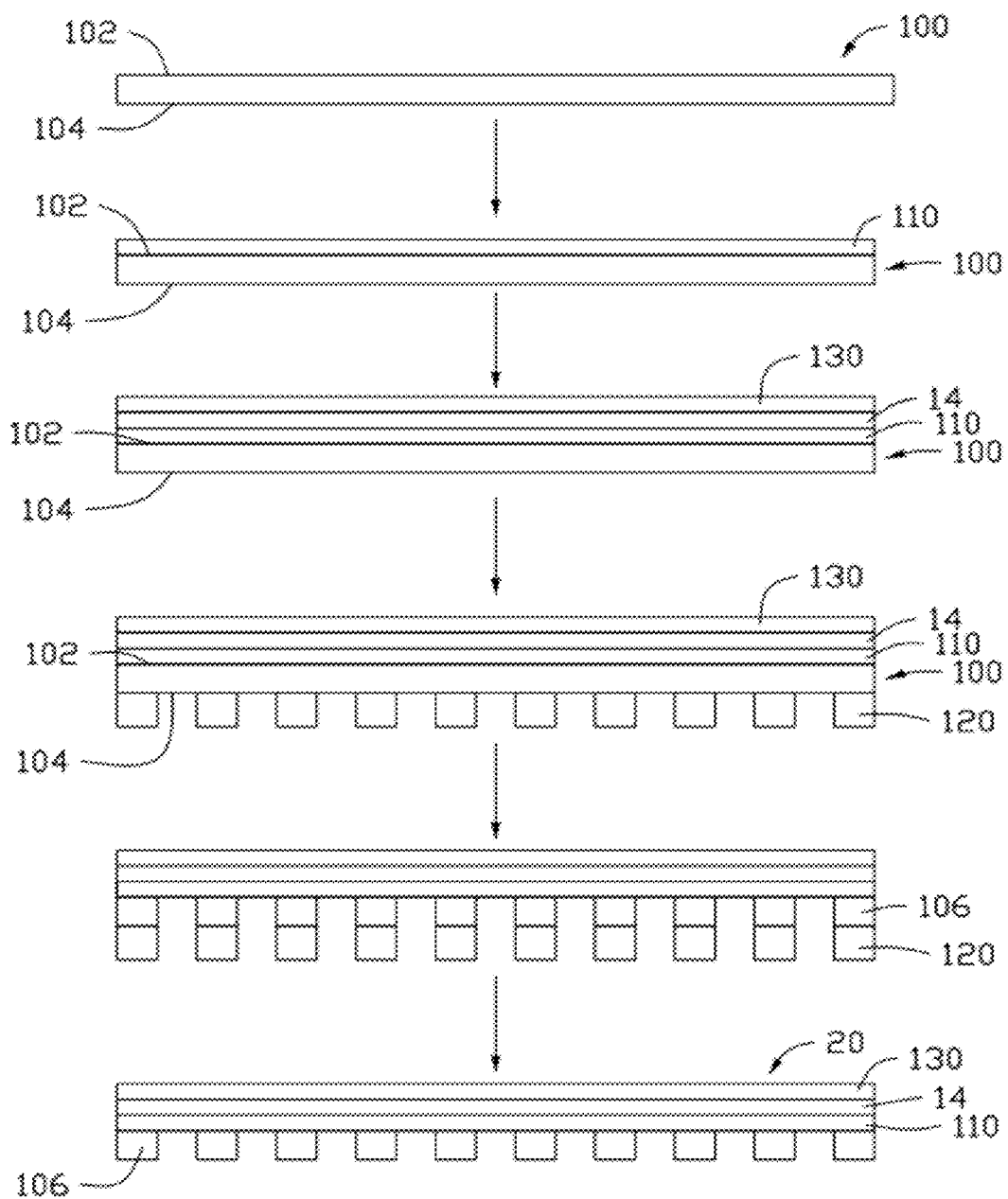
FIG. 13 shows cross-sectional views of the method in FIG. 12.

Referring to FIG. 12 and FIG. 13, in another embodiment, a method for making a graphene/carbon nanotube composite structure 20 includes:

S10, providing a metal substrate 100 including a first surface 102 and a second surface 104 opposite to each other;

S20, growing a graphene film 110 on the first surface 102 of the metal substrate 100 by a CVD method;

S30, providing at least one carbon nanotube film structure 14 on the graphene film 110, and combining the at least one carbon nanotube film structure 14 with the graphene film 110;

S40, coating a polymer layer 130 on the at least one carbon nanotube film structure 14, and combining the polymer layer 130 with the at least one carbon nanotube film structure 14 and the graphene film 110; and S50, forming a plurality of stripped electrodes 106 by etching the metal substrate 100 from the second surface 104.

Figure 14:
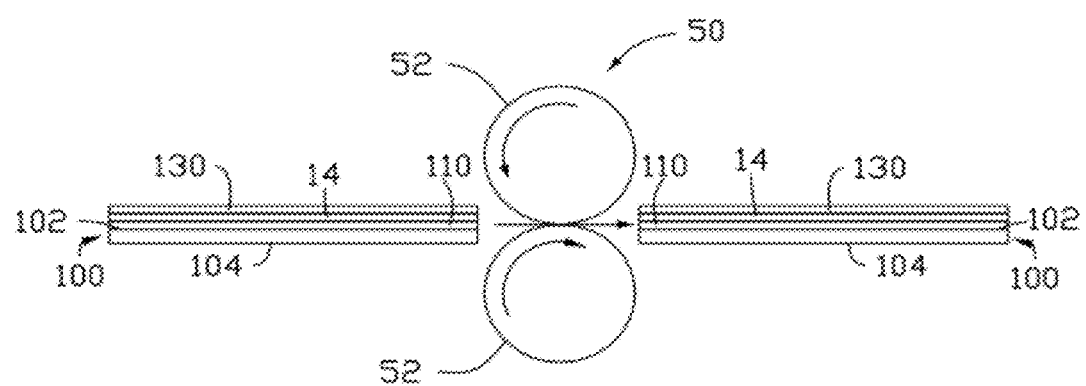
FIG. 14 shows a cross-sectional view of a heat pressing process used in the method of FIG. 12 and FIG. 13.

Steps of S10, S20, S30, and S50 correspond to the steps of S1, S2, S3, and S4 of one embodiment. Referring to FIG. 14, a hot-press device 50 is used in step S40 by a hot-pressing method. The hot-press device 50 is a hot-press machine and includes a heating device (not shown) and a pressing device 52. The heating device is used to heat the pressing device 52. The hot-pressing method in S40 includes the following steps:

S410, placing the metal substrate 100 with the graphene film 110, the at least one carbon nanotube film structure 14 and the polymer layer 130 in the hot-press device 50;

S420, heating the pressing device 52 of the hot-press device 50; and

S430, pressing the metal substrate 100 with the graphene film 110, the at least one carbon nanotube film structure 14 and the polymer layer 130 thereon using the pressing device 52.

The polymer layer 130 can be made of a polymer solution or a melted polymer material. The polymer solution can be formed by dissolving a polymer material in an organic solution. The polymer solution has a certain viscosity. In one embodiment, the viscosity of the solution can be greater than 1 Pa·s. The polymer material of the polymer solution and the melted polymer material can be in a solid state at room temperature, and can be transparent. The polymer material can be polystyrene, polyethylene, polycarbonate, PMMA, PC, PET, BCB, or polyalkenamer. The organic solution can be ethanol, methanol, acetone, dichloroethane, or chloroform. In one embodiment, the polymer material is PMMA, and the organic solution is ethanol.

A temperature of the pressing device 52 can range from about 110° C. to about 120° C. In one embodiment, the pressing device 52 includes two rollers. The metal substrate 100 is slowly passed through the two rollers during the pressing process. A speed of the metal substrate 100 is from about 1 millimeter per minute to about 10 meters per minute. In some other embodiments, a certain pressure is applied to the metal substrate 100 by the heated roller. As such, the polymer layer 130 is pressed uniformly to disperse the polymer of the polymer layer 130 into the at least one carbon nanotube film structure 14, thus the polymer layer 130, the at least one carbon nanotube film structure 14, and the graphene film 110 are combined to form a whole structure.

Figure 15:
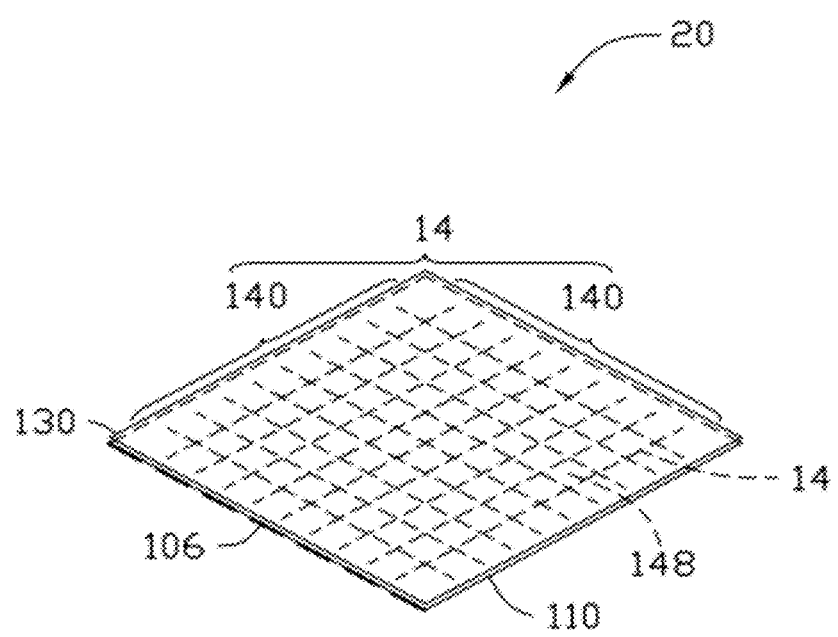
FIG. 15 is a schematic view of the graphene/carbon nanotube composite structure made by the method shown in FIG. 12.

Referring to FIG. 15, the graphene/carbon nanotube composite structure 20 includes a polymer layer 130, a carbon nanotube film structure 14, a graphene film 110, and a plurality of stripped electrodes 106. The graphene film 110 is disposed on the plurality of stripped electrodes 106. The plurality of stripped electrodes 106 can be substantially parallel to each other and electrically connected with the graphene film 110. The graphene film 110 is sandwiched between the carbon nanotube film structure 14 and the plurality of stripped electrodes 106, and respectively contacts the carbon nanotube film structure 14 and the plurality of stripped electrodes 106. The plurality of stripped electrodes 106 can support the graphene film 110 and the carbon nanotube film structure 14 and can be used as electrodes in application. The polymer layer 130 covers and protects the carbon nanotube film structure 14.

Figure 16:
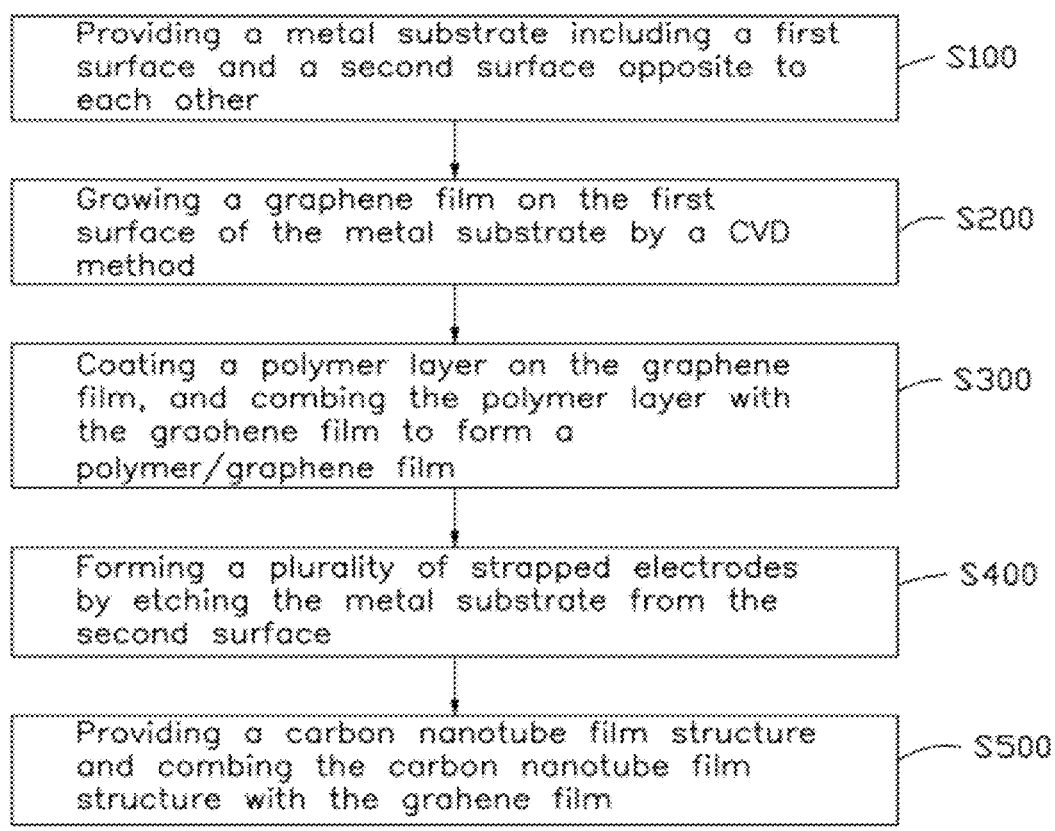
FIG. 16 is a flowchart of another embodiment of a method for making a graphene/carbon nanotube composite structure at various stages.
Figure 17:
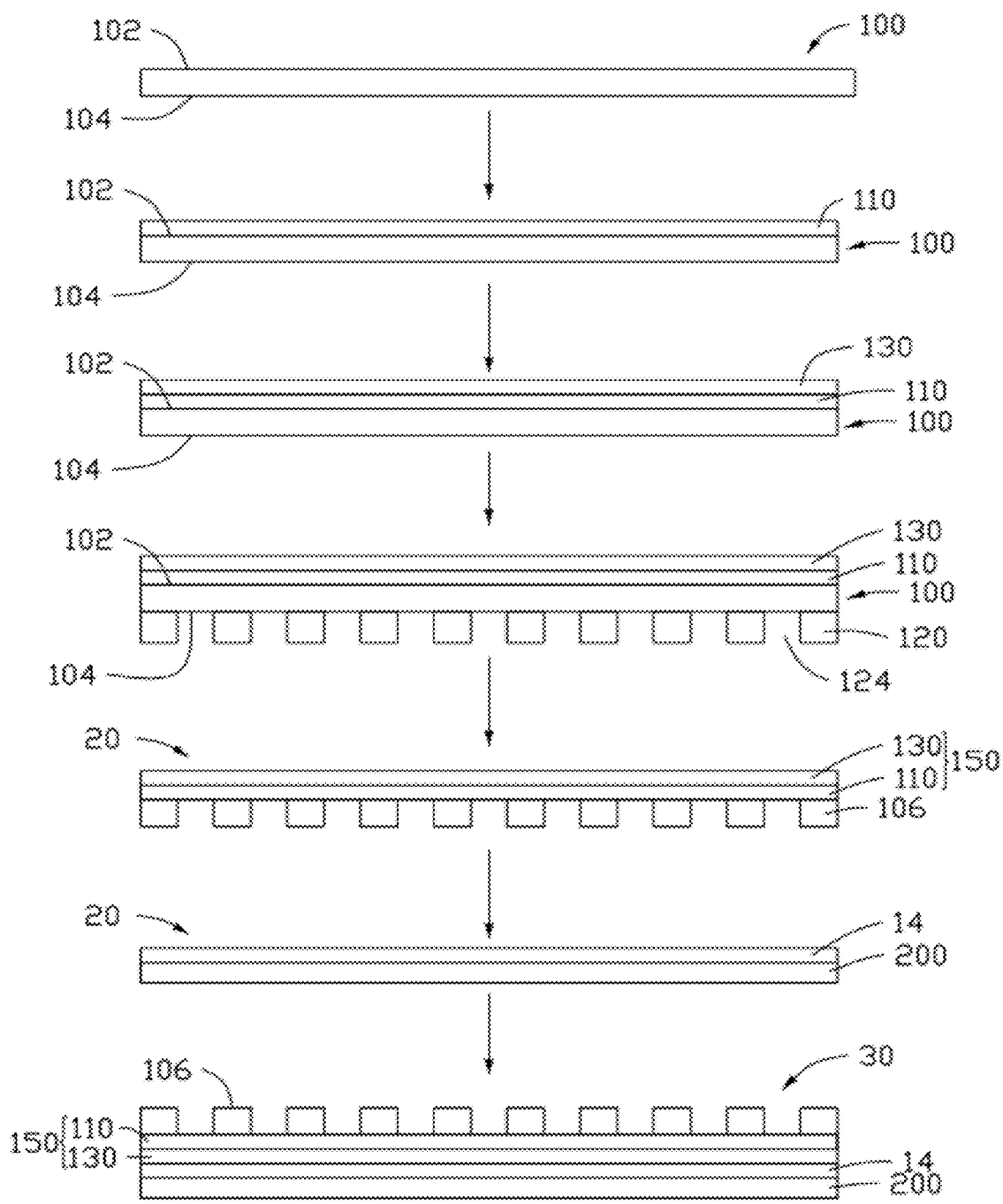
FIG. 17 a schematic view of the graphene/carbon nanotube composite structure made by the method in FIG. 16.

Referring to FIG. 16 and FIG. 17, in another embodiment, a method for making a graphene/carbon nanotube composite structure 30 includes:

S100, providing a metal substrate 100 including a first surface 102 and a second surface 104 opposite to each other;

S200, growing a graphene film 110 on the first surface 102 of the metal substrate 100 by a CVD method;

S300, coating a polymer layer 130 on the graphene film 110, and combining the polymer layer 130 with the graphene film 110 to form a polymer/graphene film 150;

S400, forming a plurality of stripped electrodes 106 by etching the metal substrate 100 from the second surface 104; and S500, providing a carbon nanotube film structure 14 and combining the carbon nanotube film structure 14 with the graphene film 110.

Steps of S100, S200, S300, and S400 correspond to the steps of S1, S2, S3, and S4 of one embodiment. The step S500 includes the following steps:

S510, providing a carbon nanotube film structure 14 formed on a substrate 200;

S520, stacking the graphene film 110 with the polymer layer 130 and the stripped electrodes 106 on the carbon nanotube film structure 14;

S530, combining the graphene film 110 with the carbon nanotube film structure 14.

In step S510, the carbon nanotube film structure 14 can be formed by any method described in any of the embodiments described above. The substrate 200 is used to support the carbon nanotube film structure 14 and provide a platform for the combination of the carbon nanotube film structure 14 and the graphene film 110. The substrate 200 can be made of a flexible material. The material of the substrate 200 can be phenolic resin (PF), polystyrene (PS), ethoxyline resin (EP), polyurethane (PU), PMMA, PC, (PET), or polyalkenamer. In one embodiment, the substrate 200 is a PET film.

In Step S300, the polymer layer 130 can be combined with the graphene film 110 to form a whole structure, such as the polymer/graphene film 150. Therefore, in step S520, the graphene film 110 with the polymer layer 130 and the stripped electrodes 106 can be moved as a whole structure on the carbon nanotube film structure 14.

In step S530, the polymer layer 130 can be directly connected with the carbon nanotube structure 14, and the combination is processed by a heat-pressing method described above.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a graphene/carbon nanotube composite structure, the method comprising:

providing a metal substrate comprising a first surface and a second surface opposite to the first surface;

growing a graphene film on the first surface of the metal substrate by a CVD method;

applying a carbon nanotube film structure on the graphene film, and combining the carbon nanotube film structure with the graphene film, wherein the carbon nanotube film structure is a free-standing structure;

coating a polymer layer on the carbon nanotube film structure, and combining the polymer layer with the carbon nanotube film structure and the graphene film; and forming a plurality of stripped electrodes by etching the metal substrate from the second surface.

2. The method of claim 1, wherein the metal substrate has a thickness in a range from about 100 nanometers to about 100 micrometers.

3. The method of claim 2, wherein the metal substrate is made of copper or nickel.

4. The method of claim 1, wherein the graphene film is grown on the first surface of the metal substrate by the steps of:

disposing the metal substrate in a reacting chamber;

heating the metal substrate to a predetermined temperature; and supplying a carbon source gas into the reacting chamber, thereby forming the graphene film on the first surface of the metal substrate.

5. The method of claim 4, further comprising importing hydrogen gas in the reacting chamber during the process of heating the metal substrate to the predetermined temperature.

6. The method of claim 5, wherein the predetermined temperature is in a range from about 800° C. to about 1500° C.

7. The method of claim 5, further comprising continuously importing the hydrogen gas in the reacting chamber during the forming of the graphene film on the first surface of the metal substrate.

8. The method of claim 7, wherein a ratio between flow rates of the carbon source gas and the hydrogen gas is in a range from about 45:2 to about 15:2.

9. The method of claim 8, further comprising cooling the metal substrate after forming the graphene film, and continuously flowing the carbon source gas and the hydrogen gas into the reacting chamber during the cooling of the metal substrate.

10. The method of claim 1, wherein the carbon nanotube film structure is made of one drawn carbon nanotube film or a plurality of drawn carbon nanotube films stacked with each other, and the drawn carbon nanotube film is drawn from a carbon nanotube array.

11. The method of claim 10, wherein the drawn carbon nanotube film is made by steps of:

providing a carbon nanotube array;

selecting a carbon nanotube segment having a predetermined width from the carbon nanotube array; and pulling the carbon nanotube segment at a uniform speed to achieve a uniform drawn carbon nanotube film.

12. The method of claim 11, wherein the carbon nanotube film structure is made by steps of:

providing a frame and adhering one drawn carbon nanotube film to the frame along a first direction and removing excess film outside the frame;

adhering another drawn carbon nanotube film to the frame along a second direction to overlap the one drawn carbon nanotube film;

repeating the above steps thereby forming the carbon nanotube film structure.

13. The method of claim 12, wherein the carbon nanotube film structure is treated with an organic solvent, the carbon nanotube film is fixed on the frame during the organic solvent treating process.

14. The method of claim 12, wherein the one and the another drawn carbon nanotube film are treated with a laser having a power density being greater than $0.1 \times 10^4$ W/m$^2$.

15. The method of claim 1, wherein the polymer layer is made of a material selected from the group consisting of polystyrene, polyethylene, polycarbonate, polymethyl methacrylate (PMMA), polycarbonate (PC), terephthalate (PET), benzo cyclo butene (BCB), and polyalkenamer.

16. The method of claim 1, wherein the polymer layer with the at least one carbon nanotube film structure and the graphene film are combined by a hot-pressing method, a temperature in the hot-pressing method ranging from about 110° C. to about 120° C.

17. A method for making a graphene/carbon nanotube composite structure, the method comprising:

providing a metal substrate comprising a first surface and a second surface opposite to the first surface;

growing a graphene film on the first surface of the metal substrate by a CVD method;

coating a polymer layer on the graphene film, and combining the polymer layer with the graphene film;

forming a plurality of stripped electrodes by etching the metal substrate from the second surface; and providing at least one carbon nanotube film structure, and combining the at least one carbon nanotube film structure with the graphene film, wherein the at least one carbon nanotube film structure is a free-standing structure.

18. The method of claim 17, wherein the at least one carbon nanotube film structure is located on a frame, and the polymer layer contacts the at least one carbon nanotube film structure during combining at least one carbon nanotube film structure with the graphene film.

19. The method of claim 18, wherein the at least one carbon nanotube film structure is treated with an organic solvent, the at least one carbon nanotube film structure is fixed on the frame during the organic solvent treating process.

20. The method of claim 17, wherein the graphene film is grown on the first surface of the metal substrate by the steps of:

disposing the metal substrate in a reacting chamber;

heating the metal substrate to a predetermined temperature; and supplying a carbon source gas into the reacting chamber, thereby forming the graphene film on the first surface of the metal substrate.

* * * * *